United States Patent
Kim et al.

(10) Patent No.: US 12,233,967 B2
(45) Date of Patent: Feb. 25, 2025

(54) METHOD AND APPARATUS FOR CONTROLLING STEERING SYSTEM OF VEHICLE

(71) Applicant: HL MANDO CORPORATION, Gyeonggi-do (KR)

(72) Inventors: Taesik Kim, Gyeonggi-do (KR); Taehyung Sun, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 247 days.

(21) Appl. No.: 17/875,329

(22) Filed: Jul. 27, 2022

(65) Prior Publication Data

US 2023/0322296 A1    Oct. 12, 2023

(30) Foreign Application Priority Data

Apr. 8, 2022    (KR) .................. 10-2022-0043980

(51) Int. Cl.
 *B62D 5/04*    (2006.01)
 *B62D 1/183*   (2006.01)
 *B62D 6/02*    (2006.01)

(52) U.S. Cl.
 CPC .......... *B62D 5/0484* (2013.01); *B62D 1/183* (2013.01); *B62D 6/02* (2013.01)

(58) Field of Classification Search
 CPC ........ B62D 5/0484; B62D 1/183; B62D 6/02; B62D 5/0481; B62D 1/181; B62D 1/04; B62D 1/18; B62D 1/22; B62D 5/003; B60Y 2306/13; B60Y 2306/15

See application file for complete search history.

(56) References Cited

U.S. PATENT DOCUMENTS

| | | | |
|---|---|---|---|
| 2019/0308662 A1* | 10/2019 | Christiansen | B62D 1/183 |
| 2020/0339176 A1* | 10/2020 | Cao | B62D 1/183 |
| 2021/0221434 A1* | 7/2021 | Liu | B62D 15/025 |
| 2022/0315100 A1* | 10/2022 | Shimizu | B60W 50/029 |
| 2023/0040044 A1* | 2/2023 | Kakas | B62D 15/025 |

FOREIGN PATENT DOCUMENTS

| | | | |
|---|---|---|---|
| DE | 102020206879 A1 | * | 12/2021 |
| KR | 20160079594 A | * | 7/2016 |

OTHER PUBLICATIONS

English translation of Galehr (DE_102020206879) (Year: 2021).*
English tranlsation of Park (KR-20160079594) (Year: 2016).*

* cited by examiner

*Primary Examiner* — James M McPherson
*Assistant Examiner* — Kyle J Kingsland
(74) *Attorney, Agent, or Firm* — WOMBLE BOND DICKINSON (US) LLP (57) ABSTRACT

The present disclosure relates to a method and an apparatus for controlling a steering system, and more particularly, to a method and an apparatus for adjusting an operation mode of a steering system according to the degree by which a steering wheel is stowed or the degree by which the steering wheel is folded.

17 Claims, 8 Drawing Sheets

METHOD AND APPARATUS FOR CONTROLLING STEERING SYSTEM OF VEHICLE

CROSS-REFERENCE TO RELATED APPLICATIONS

This application claims priority under 35 U.S.C. § 119 to Korean Patent Application No. 10-2022-0043980, filed on Apr. 8, 2022, in the Korean Intellectual Property Office (KIPO), the disclosure of which is incorporated by reference herein in its entirety.

TECHNICAL FIELD

The present disclosure relates to a method and an apparatus for controlling a steering system, and more particularly, to a method and an apparatus for adjusting an operation mode of a steering system according to the degree by which a steering wheel is stowed or the degree by which the steering wheel is folded.

BACKGROUND

The content described in this section merely provides background information on the present disclosure and does not constitute a prior art.

According to ECE R-79 that is a steering system approval regulation of the Economic Commission for Europe (ECE), a driver must be able to drive in a FIG. 8 even in the event of a failure in a steering system.

However, if a failure occurs in the stowable steering system in which a steering wheel is stowable on a dash panel, so that the steering wheel does not come out from the dash panel to a drivable position, the driver cannot drive in a FIG. 8 or may have difficulty in driving in a FIG. 8.

Even when the steering wheel is not deformed into a drivable form due to occurrence of a failure in the foldable steering system in which the steering wheel is foldable, the driver cannot drive in a FIG. 8 or may have difficulty in driving in a FIG. 8.

Therefore, when a failure occurs in the stowable steering system or the foldable steering system and driving is difficult or impossible, it is required to prepare a method for enabling driving by replacing these systems.

SUMMARY

The present disclosure has been made in an effort to provide a method and an apparatus for enabling a driver to smoothly drive in all of the various situations by changing a mode of a steering system according to a state of a steering wheel.

An exemplary embodiment of the present disclosure provides a control method performed by a control device controlling a steering system of a vehicle, the control method including: determining whether a failure has occurred in the steering system by using detection data obtained by detecting the degree of operation of a steering wheel; and determining an operation mode of the steering system to any one of a normal operation mode and an emergency operation mode based on a result of the determination, in which the steering wheel is a stowable steering wheel or a foldable steering wheel.

Another exemplary embodiment of the present disclosure provides a control device for controlling a steering system of a vehicle, the control device including: a memory configured to store one or more programs for controlling the steering system; and a processor configured to drive the programs stored in the memory to control the steering system, in which the processor determines whether a failure has occurred in the steering system by using detection data obtained by detecting the degree of operation of a steering wheel, and determines an operation mode of the steering system to any one of a normal operation mode and an emergency operation mode based on a result of the determination, and the steering wheel is a stowable steering wheel or a foldable steering wheel.

The present disclosure provides an operation mode suitable for various states of the steering wheel, thereby enabling a driver to smoothly drive and securing sufficient stability.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Hereinafter, exemplary embodiments of the present disclosure will be described in detail with reference to the accompanying drawings. In denoting reference numerals to the constituent elements of each drawing, it should be noted that the same constituent elements are given the same reference numerals as much as possible even though they are indicated on different drawings. Further, in the following description of the present disclosure, a detailed description of known configurations or functions incorporated herein will be omitted when it is judged that the detailed description may make the subject matter of the present disclosure unclear.

In describing the constructional elements of the present disclosure, the terms of a first, a second, A, B, (a), (b), or the like, may be used. Such a term is only for discriminating the constructional element from another constructional element, and does not limit the essential feature, order, or sequence of the constructional element, or the like. In addition, unless explicitly described to the contrary, the word "comprise" and variations such as "comprises" or "comprising", will be understood to imply the inclusion of stated elements but not the exclusion of any other elements. In addition, the terms "-unit", "module", and the like described in the specification mean units for processing at least one function and operation and can be implemented by hardware constituent elements or software constituent elements and combinations thereof.

In order to prevent arbitrary manipulation by a driver during autonomous driving and to secure sufficient interior space of a vehicle, a stowable steering wheel or a foldable steering wheel has been mounted to the vehicle.

In the process of switching driving from driving by a driver to autonomous driving, the stowable steering wheel is stowed in a dash panel of a vehicle, and the foldable steering wheel is transformed into a form that occupies less space.

On the contrary, in the process of switching driving from autonomous driving to driving by a driver, the stowable steering wheel comes out from the dash panel of the vehicle to a drivable position, and the foldable steering wheel is restored to a drivable form.

Figure 1:
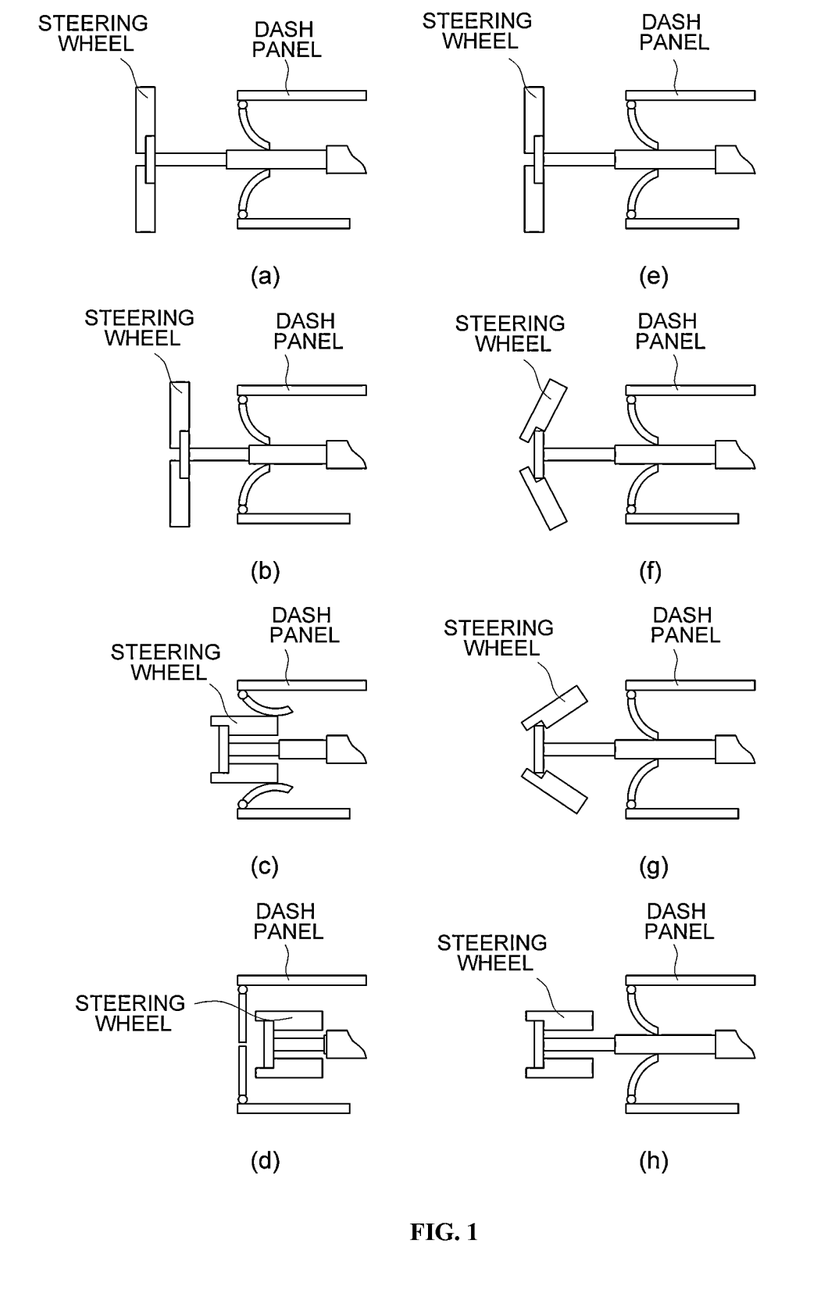
FIG. 1 is a diagram illustrating an example illustrating various states of a stowable steering wheel and a foldable steering wheel.

As illustrated in (a) and (e) of FIG. 1, when the stowable steering wheel and the foldable steering wheel are normally driven, the stowable steering wheel comes out to a sufficient position for driving, and the foldable steering wheel is restored to a form sufficient for driving.

However, a failure may occur in the stowable steering wheel (stowable steering system) and the foldable steering wheel (foldable steering system) in the process of switching the driving from autonomous driving to driving by a driver. In this case, the stowable steering wheel may not come out to a position sufficient for driving, and the foldable steering wheel may not be restored to a form sufficient for driving.

For example, as illustrated in (b) and (f) of FIG. 1, the stowable steering wheel only comes out to a position where driving is somewhat difficult ((b) of FIG. 1), or the foldable steering wheel may be restored to a form somewhat difficult for driving ((f) of FIG. 1). As another example, as in (c) and (g) of FIG. 1, the stowable steering wheel may only come out to a position at which the driving is very difficult ((c) of FIG. 1), or the foldable steering wheel may be restored to a form in which the driving is very difficult ((f) of FIG. 1). As another example, as in (d) and (h) of FIG. 1, the stowable steering wheel may only come out to a position at which the driving is impossible ((d) of FIG. 1), or the foldable steering wheel may be restored to a form in which the driving is impossible ((h) of FIG. 1).

In the cases (b) to (d) and (f) to (h) of FIG. 1, when the vehicle is driven in a normal operation mode in which steering is performed by directly manipulating the steering wheel by a driver, the driver's driving becomes very difficult or impossible, so that the risk of a safety accident may greatly increase.

The present disclosure relates to a method and an apparatus for promoting smooth driving by a driver and preventing safety accidents from occurring by adjusting an operation mode of a steering system according to various operation states of a steering wheel.

Figure 2:
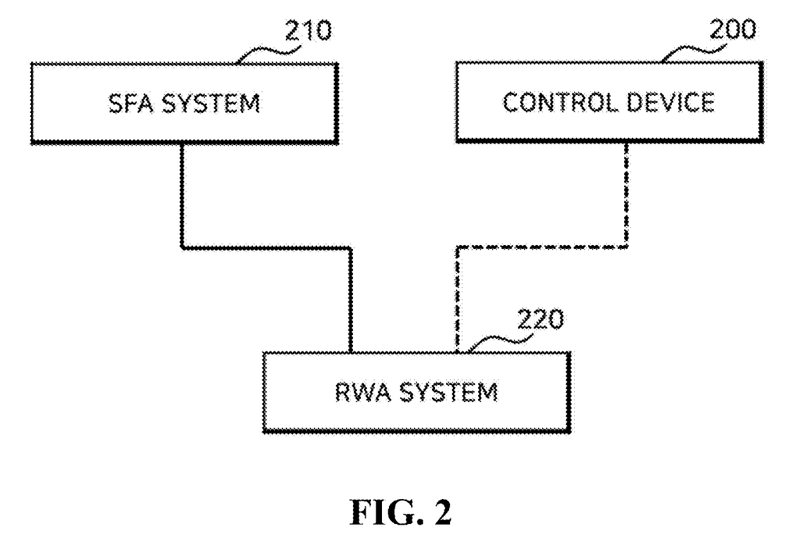
FIG. 2 is a block diagram illustrating an example of a steering system.
Figure 3:
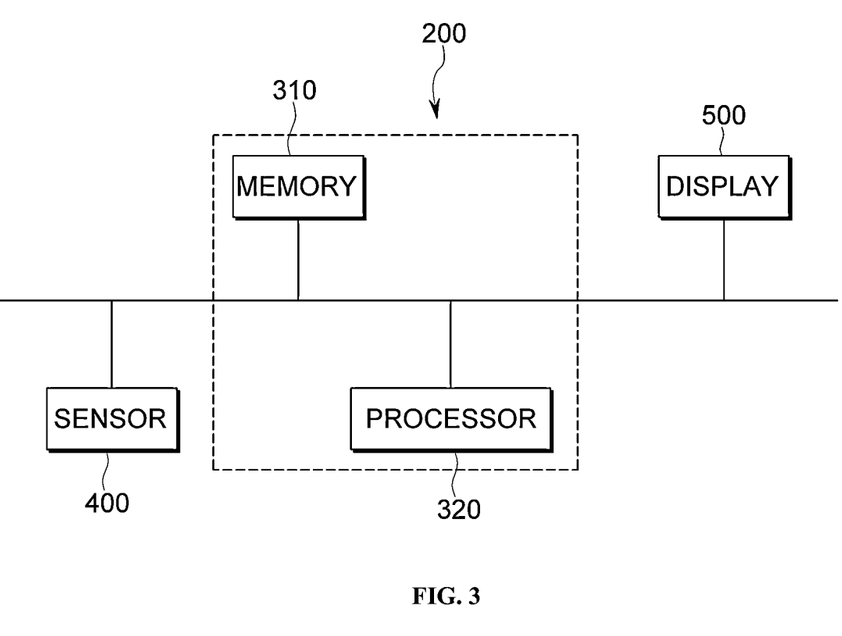
FIG. 3 is a block diagram illustrating an example of a control device.

FIG. 2 is a block diagram illustrating an example of a steering system to which the present disclosure is applied, and FIG. 3 is a block diagram illustrating an example of a control device 200 controlling the steering system (hereinafter, referred to as a "control device").

As illustrated in FIG. 2, the steering system may include a Steer-By-Wire (SBW) system in which a Steering Feedback Actuator (SFA) system 210 and a Road Wheel Actuator (RWA) system 220 are combined, and the control device 200. The control device 200 may be electrically connected with the SBW system.

The SBW system is a steering system that transmits the driver's will to steer only through an electrical connection without a mechanical connection between the steering wheel and the road wheel. The SBW system performs steering by operating a steering motor under the control of an Electronic Control Unit (ECU) that senses the rotation of the steering wheel (steering will) and controlling a road wheel connected to the steering motor.

The RWA system 220 transmits the driver's will to steer to the road wheel in order to move the road wheel, and the SFA system 210 provides reaction force of the steering wheel. The SFA system 210 may include a steering wheel, a steering shaft, a reaction force motor, a steering angle sensor, a steering torque sensor, and the like. The driver's will to steer may be input to the SFA system 210 through the steering wheel.

The steering system to which the present disclosure is applied may utilize the SBW system as a normal operation mode. That is, when driving by the driver is possible, the SBW system may implement steering as the normal operating mode. Unlike this, in a state in which driving by the driver is impossible, steering may be implemented through an emergency operation mode.

Any one of the normal operation mode and the emergency operation mode may be selected by the control device 200. When the control device 200 selects the normal operation mode as the operation mode of the steering system, steering may be implemented by the SBW system, and when the control device 200 selects the emergency operation mode as the operation mode of the steering system, steering may be implemented by the emergency operation mode. When the emergency operation mode is applied, the RWA system 220 may be driven by direct control of the control device 200 as illustrated in FIG. 2.

As illustrated in FIG. 3, the control device 200 may include a memory 310 and a processor 320. Further, the control device 200 may further include a sensor 400.

The memory 310 stores one or more programs for controlling the steering system. In addition, the memory 310 may store a preset set value (preset stowing value) for the degree in which the stowable steering wheel is stowed and a preset set value (preset folding value) for the degree in which the foldable steering wheel is folded. Furthermore, the memory 310 may store a speed value preset for a speed of the vehicle.

The processor 320 may perform the overall control of the steering system by utilizing data stored in the memory 130. In addition, the processor 320 may control to display various screen information on a display 500 connected to the control device 200. The display 500 may be mounted on a vehicle, and according to an exemplary embodiment, the display 500 may be installed in front of a driver in the vehicle. Also, the display 500 may also be activated only when the operation mode of the steering system is determined to be the emergency operation mode.

Figure 4:
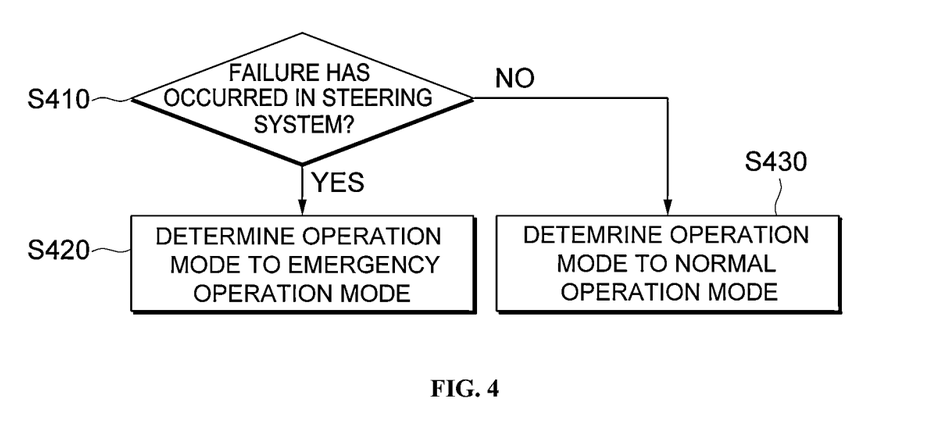
FIGS. 4 to 8 are flowcharts illustrating various exemplary embodiments of a control method.
Figure 5:
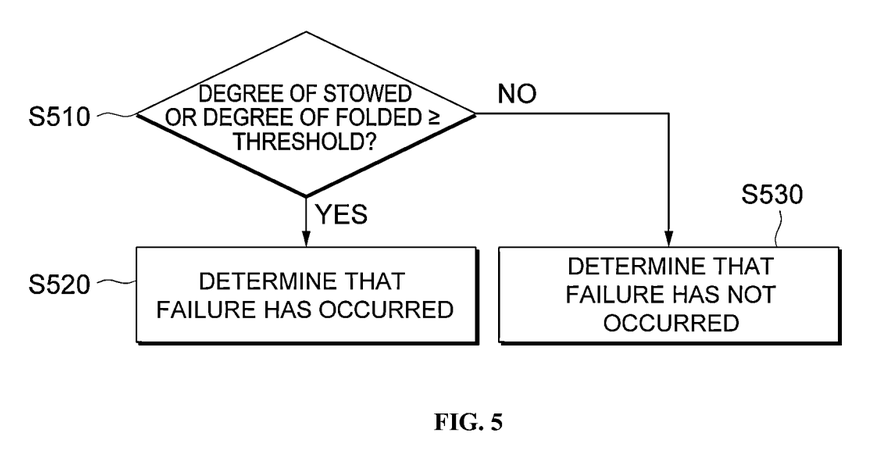

FIGS. 4 and 5 are flowcharts illustrating examples of a method of controlling the steering system (hereinafter, referred to as "the control method").

Referring to FIG. 4, the processor 320 may determine whether a failure has occurred in the steering system (stowable steering wheel or foldable steering wheel) by using detection data (S410).

The sensor 400 may detect the operation degree of the stowable or foldable steering wheel, and may generate detection data corresponding to the result. The detection data may be expressed as a numerical value of the degree to which the steering wheel is stowed in the dash panel or folded.

The processor 320 may determine the operation mode of the steering system to one of a normal operation mode and an emergency operation mode based on the determination result (S420 and S430). For example, when it is determined that the failure has occurred in the steering system, the operation mode of the steering system may be determined to the emergency operation mode (S420), and when it is determined that the failure has not occurred in the steering system, the operation mode of the steering system may be determined to the normal operation mode (S430).

Here, the normal operation mode may be the SBW system described above. The emergency operation mode may be a mode in which driving is implemented through means other than a method in which the driver directly manipulates the steering wheel. For example, the emergency operation mode may be a limp aside mode, a touch and drag steering mode, and an emergency operation mode, which are to be described below.

The limp aside mode is a mode for moving the corresponding vehicle to the area around the road by autonomous driving of the vehicle, and the touch-and-drag steering mode is a mode for implementing steering of a vehicle according to a user's input that is input to the display 500. The emergency operation mode is a mode that stops the vehicle and stops the steering system.

Depending on an exemplary embodiment, the process (S410) of determining whether a failure has occurred in the steering system may be performed by comparing the detection data with a threshold value. A flowchart for this exemplary embodiment is illustrated in FIG. 5.

The processor 320 may determine whether a failure has occurred in the steering system (stowable steering wheel or foldable steering wheel) by comparing the detection data with a preset threshold (S510).

For example, when the degree of stowing of the stowable steering wheel indicated by the detection data is equal to or greater than a preset stowing value, it is determined that a failure has occurred in the steering system, and when the degree of folding of the foldable steering wheel indicated by the detection data is equal to or greater than a preset folding value, it is determined that a failure has occurred in the steering system.

The preset stowing value and the preset folding value may be separately set by each driver, or may also be stored in advance based on past histories of failures in the steering system.

When it is determined that the failure has occurred in the steering system, the processor 320 may determine the operation mode of the steering system to the emergency operation mode (S520), and when it is determined that the failure has not occurred in the steering system, the processor 320 may determine the operation mode of the steering system to the normal operation mode (S530).

Figure 6:
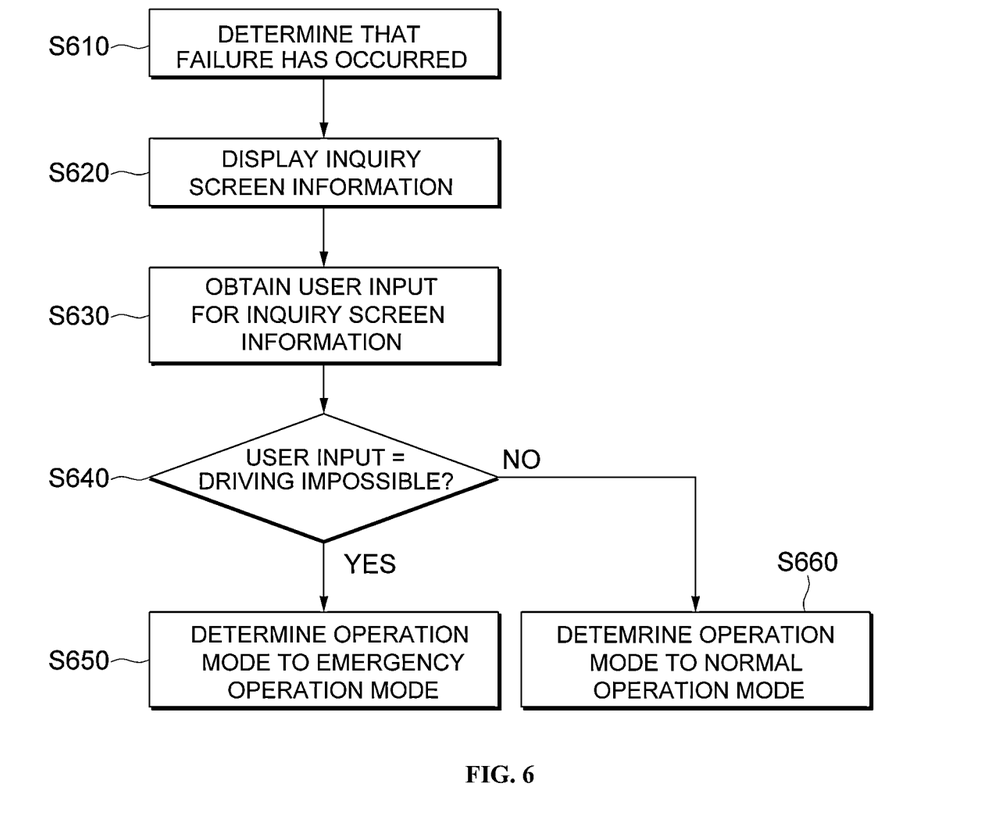

FIG. 6 is a flowchart for describing another example of the control method.

As illustrated in FIG. 1, the degree of stowing and the degree of folding may be very diverse. Therefore, even if it is determined that the failure has occurred based on the degree of stowing of the stowable steering wheel or the degree of folding of the foldable steering wheel, there may exist cases in which driving is possible according to the characteristics of the individual driver. Reflecting this point, the present disclosure may further optimize the selection of the normal operation mode or the emergency operation mode to suit the driver's individual characteristics.

When it is determined that the failure has occurred (S610), the processor 320 may display screen information (inquiry screen information) inquiring whether steering is possible through the display 500 (S620). Here, whether steering is possible means whether the driver can directly drive the vehicle.

When the user who viewed the inquiry screen information selects any one of driving possible or driving impossible, a user input corresponding to the selection is obtained (S630), and the processor 320 may determine whether driving is possible according to the user input (S640).

When it is determined that driving is impossible, the processor 320 may determine the operation mode of the steering system to the emergency operation mode (S650), and when it is determined that driving is possible, the processor 320 may determine the operation mode of the steering system to the normal operation mode (S660).

Figure 7:
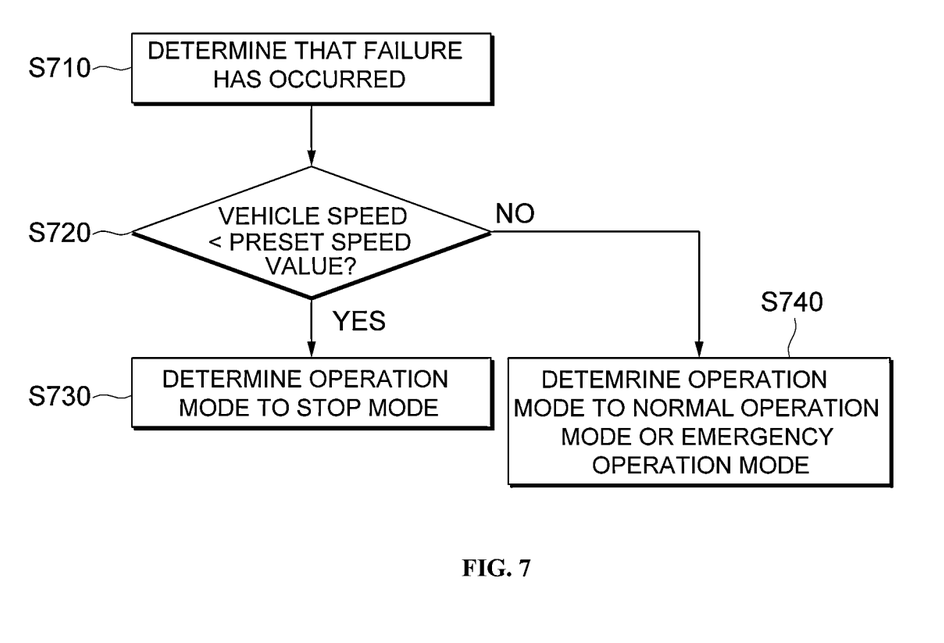

FIG. 7 is a flowchart for describing another example of the control method.

The stop mode is a mode that stops the vehicle and stops the steering system, so the stop mode may adversely affect the traffic situation on the road or cause a crash due to stopping, and if stopping the vehicle corresponds to an abrupt stop, it may threaten the safety of passengers.

The present disclosure may be configured to operate the stop mode only under a specific condition in consideration of this point, and the specific condition may be determined based on the speed of the vehicle.

When it is determined that the failure has occurred in the steering system (S710), the processor 320 may detect a speed of the vehicle and determine whether the speed of the vehicle is less than a preset speed value (S720). The preset speed value may be set according to the possibility of adversely affecting the traffic condition of the road by stop of the vehicle, the possibility of occurrence of a collision accident due to the stop, and the like.

When the speed of the vehicle is less than the preset speed value, the processor 320 may determine the operation mode of the steering system to the stop mode (S730), and when the speed of the vehicle is equal to or greater than the preset speed value, the processor 320 may determine the operation mode of the steering system to the normal operation mode or the emergency operation mode (except for the stop mode) (S740).

Figure 8:
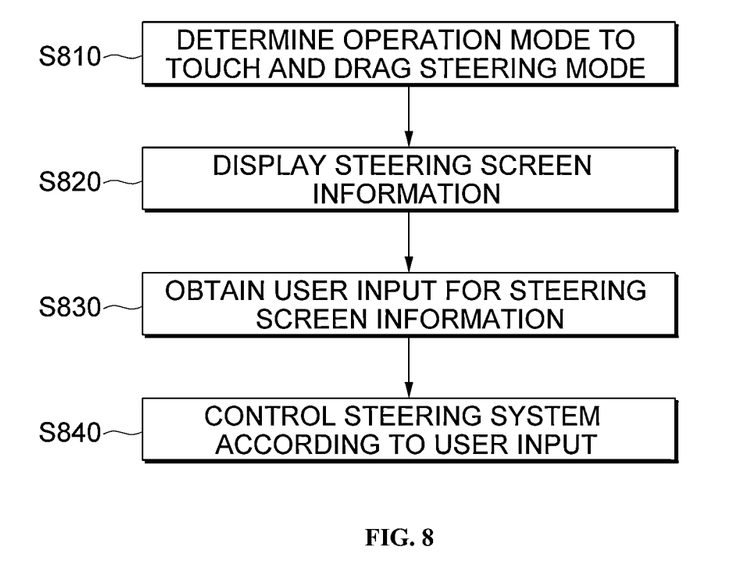

FIG. 8 is a flowchart for describing the touch-and-drag steering mode.

When a failure occurs in the steering system and the touch-and-drag steering mode is determined as the operation mode of the steering system (S810), the processor 320 displays screen information (steering screen information) that may be manipulated by the user through the display 500 (S820). The steering screen information may be formed in various forms through which a user may perform steering by a touch input or the like.

When the user controls the steering of the vehicle through the steering screen information and a user input according to the control is obtained (S830), the processor 320 may control the steering system (specifically, the RWA system) according to the user input (S840).

Although it is described that each process is sequentially executed in FIGS. 4 to 8, this is merely illustrative of the technical idea of an embodiment of the present disclosure. In other words, those skilled in the art to which the exemplary embodiment of the present disclosure pertains may variously correct, change, and apply the present disclosure by executing the present disclosure by changing the order described in FIGS. 4 to 8 or executing one or more processes among the respective processes in parallel within the range that does not depart from the essential characteristics of the exemplary embodiment of the present disclosure. Accordingly, FIGS. 4 to 8 are not limited to a chronological order.

Meanwhile, each of the processes shown in FIGS. 4 to 8 can be implemented as computer-readable codes on a computer-readable recording medium. The computer-readable recording medium includes all types of recording devices in which data readable by a computer system is stored. That is, the computer-readable recording medium includes a storage medium, such as a magnetic storage medium (for example, a ROM, a floppy disk, and a hard disk), an optically readable medium (for example, a CD-ROM, and a DVD) and a carrier wave (for example, transmission through the Internet). In addition, the computer-readable recording medium is distributed in a network-connected computer system, so that the computer-readable code may be stored and executed in a distributed manner.

Although the exemplary embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A control method performed by a control device controlling a steering system of a vehicle, the control method comprising:
   determining whether a failure has occurred in the steering system by using detection data obtained by detecting the degree of operation of a steering wheel; and
   determining an operation mode of the steering system to any one of a normal operation mode and an emergency operation mode based on a result of the determination,
   wherein the steering wheel is a stowable steering wheel or a foldable steering wheel,
   wherein the detection data represents the degree by which the stowable steering wheel is stowed in a dash panel or by which the foldable steering wheel is folded, and
   the determining includes determining that the failure has occurred in the steering system when the degree of stowing or folding represented by the detection data is equal to or larger than a preset threshold set by a driver.

2. The control method of claim 1, wherein the normal operation mode is a mode in which the steering system is driven based on a Steer-by-Wire (SbW) system.

3. The control method of claim 1, wherein the emergency operation mode is a limp aside mode.

4. The control method of claim 1, wherein the emergency operation mode is a touch and drag steering mode.

5. The control method of claim 4, further comprising:
   when the touch and drag steering mode is determined as the operation mode of the steering system, displaying steering screen information manipulatable by a user through a display installed in the vehicle; and
   controlling the steering system according to a user input for the steering screen information.

6. The control method of claim 1, wherein the determining includes:
   when it is determined that the failure has occurred in the steering system, displaying inquiry screen information inquiring whether steering is possible through a display installed in the vehicle; and
   determining the operation mode of the steering system to any one of a normal operation mode and an emergency operation mode according to a user input for the inquiry screen information.

7. The control method of claim 1, wherein the emergency operation mode includes a stop mode that stops the vehicle and stops the steering system.

8. The control method of claim 7, wherein the determining includes:
   when it is determined that the failure has occurred in the steering system, determining whether a speed of the vehicle is less than a preset speed value; and
   when the speed of the vehicle is less than the preset speed value, determining the operation mode of the steering system to the stop mode.

9. A non-transitory computer-readable recording medium in which a program for executing the method of any one of claim 1 in a computer is recorded.

10. A control device for controlling a steering system of a vehicle, the control device comprising:
    a memory configured to store one or more programs for controlling the steering system; and
    a processor configured to drive the programs stored in the memory to control the steering system,
    wherein the processor determines whether a failure has occurred in the steering system by using detection data obtained by detecting the degree of operation of a steering wheel, and
    determines an operation mode of the steering system to any one of a normal operation mode and an emergency operation mode based on a result of the determination, and
    the steering wheel is a stowable steering wheel or a foldable steering wheel,
    wherein the detection data represents the degree by which the stowable steering wheel is stowed in a dash panel or by which the foldable steering wheel is folded, and
    the processor determines that the failure has occurred in the steering system when the degree of stowing or folding represented by the detection data is equal to or larger than a preset threshold set by a driver.

11. The control device of claim 10, wherein the normal operation mode is a mode in which the steering system is driven based on a Steer-by-Wire (SbW) system.

12. The control device of claim 10, wherein the emergency operation mode is a limp aside mode.

13. The control device of claim 10, wherein the emergency operation mode is a touch and drag steering mode.

14. The control device of claim 13, wherein when the touch and drag steering mode is determined as the operation mode of the steering system, the processor displays steering screen information manipulatable by a user through a display installed in the vehicle, and
    controls the steering system according to a user input for the steering screen information.

15. The control device of claim 10, wherein when it is determined that the failure has occurred in the steering system, the processor displays inquiry screen information inquiring whether steering is possible through a display installed in the vehicle; and
    determines the operation mode of the steering system to any one of a normal operation mode and an emergency operation mode according to a user input for the inquiry screen information.

16. The control device of claim 10, wherein the emergency operation mode includes a stop mode that stops the vehicle and stops the steering system.

17. The control device of claim 16, wherein when it is determined that the failure has occurred in the steering system, the processor determines whether a speed of the vehicle is less than a preset speed value, and when the speed of the vehicle is less than the preset speed value, the processor determines the operation mode of the steering system to the stop mode.

* * * * *